United States Patent [19]

Rockenfeller et al.

[11] Patent Number: 4,706,345
[45] Date of Patent: Nov. 17, 1987

[54] CLAMPING DEVICE FOR A TRACTION MEMBER, PARTICULARLY FOR A ROPE, CABLE BELT, CORD OR THE LIKE

[75] Inventors: Gottfried Rockenfeller, Hilchenbach; Wolfgang Rockenfeller, Hilchenbach-Helberhausen; Friedheim Kunze, Hilchenbach-Vormwald, all of Fed. Rep. of Germany

[73] Assignee: Rockenfeller KG Befestigungselemente, Hilchenbach, Fed. Rep. of Germany

[21] Appl. No.: 911,963

[22] Filed: Sep. 25, 1986

[30] Foreign Application Priority Data

Oct. 1, 1985 [DE] Fed. Rep. of Germany ... 8527925[U]

[51] Int. Cl.$^4$ .............................................. F16G 11/06
[52] U.S. Cl. .................. 24/135 L; 24/135 R; 403/215
[58] Field of Search ............ 24/135 R, 135 A, 135 L, 24/135 N, 514; 403/215

[56] References Cited

U.S. PATENT DOCUMENTS

| 725,048 | 4/1903 | Cutting | 24/135 L |
|---|---|---|---|
| 739,130 | 9/1903 | Whipple | 24/135 L |
| 881,311 | 3/1908 | Eubank | 24/135 L |
| 903,594 | 11/1908 | Maddrell et al. | 24/135 L |
| 930,162 | 8/1909 | Dulinsky | 24/135 L |
| 1,714,050 | 5/1929 | Scott | 24/135 L |
| 1,940,704 | 12/1933 | Sumpter et al. | 24/135 L |
| 1,945,575 | 2/1934 | Sumpter | 24/135 L |
| 2,468,907 | 5/1949 | Wilson et al. | 24/135 L |
| 3,261,582 | 7/1966 | Bethea, Jr. | 24/135 L |
| 3,319,306 | 5/1967 | Von Tersch | 24/135 L |

Primary Examiner—Victor N. Sakran
Attorney, Agent, or Firm—Karl F. Ross; Herbert Dubno

[57] ABSTRACT

The clamping device for an elongate, continuous traction member, particularly for a rope, cable, cord, belt, strand or the like, comprises an oblong body composed of an at least nearly rigid material and at least two clamping pieces, advantageously hook-, eye- or eyelet bolts, guided transversely in the oblong body and spaced from each other which are movable by a wing nut and which each contain a receiving portion, advantageously a hook, eye or eyelet, for engaging and holding the traction member which is positionable against abutting surfaces of the oblong body. The oblong body is a massive block provided at least on opposing ends thereof with rounded surfaces and in which guiding surfaces, abutting surfaces for the clamping pieces and supporting and/or bearing surfaces for the wing nuts engaged with the clamping pieces are formed.

10 Claims, 8 Drawing Figures

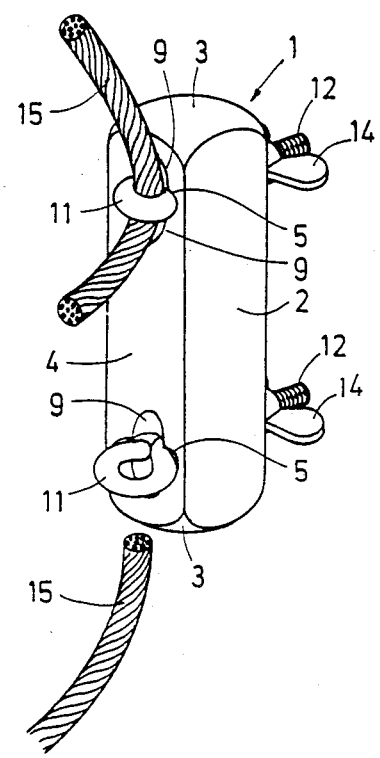
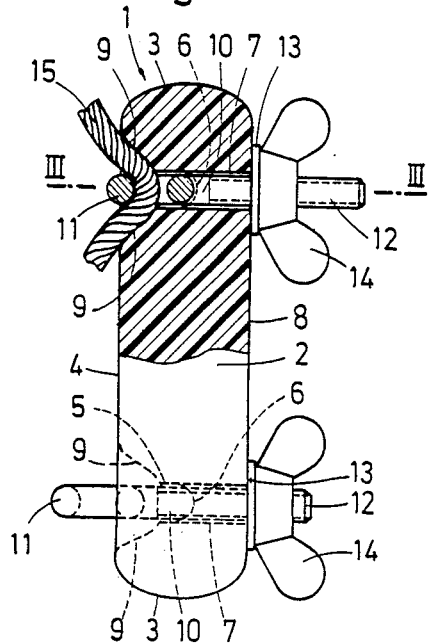
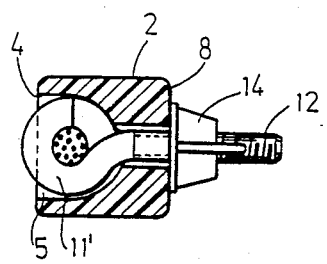
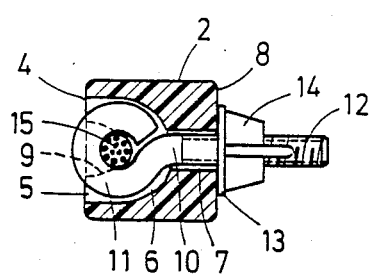

Fig. 4
Fig. 5
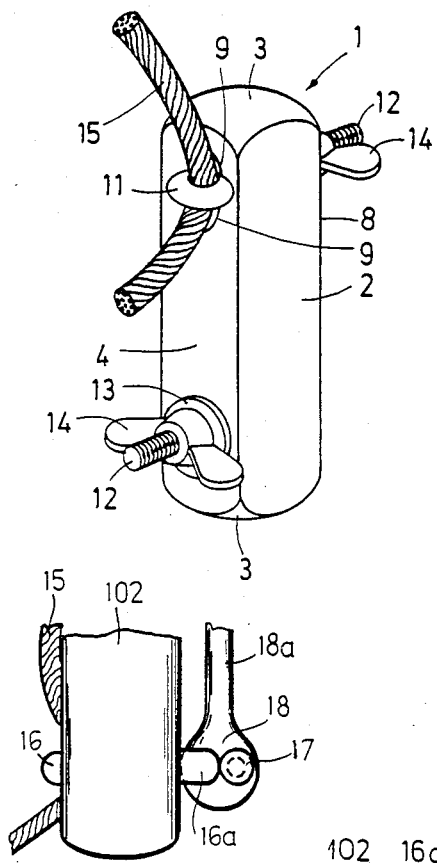
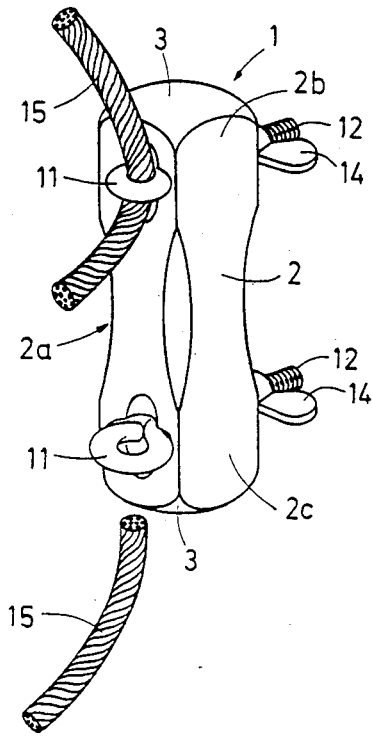
Fig. 7
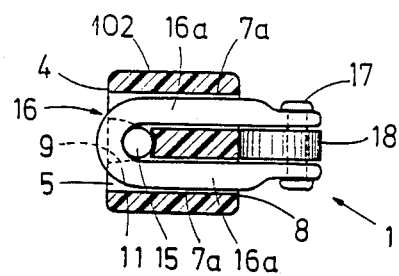
Fig. 6

CLAMPING DEVICE FOR A TRACTION MEMBER, PARTICULARLY FOR A ROPE, CABLE BELT, CORD OR THE LIKE

FIELD OF THE INVENTION

Our invention relates to a clamping device for an elongate, continuous traction member and, more particularly, to a clamping device for a rope, cable, cord, belt, strand or the like.

BACKGROUND OF THE INVENTION

Ropes, cables, cords, belts, strands and like continuous elongate members, hereinafter referred to generically as traction members, are used in all phases of engineering, for example, for erecting or stabilizing masts or for anchoring the trunk of a tree. Cable clamps or the like may be used to anchor the ends of these lines.

A clamping device can also be used for securing wash and boat line. Conventional cable or rope clamps are not fully satisfactory and knot-tying is not generally a satisfactory alternative.

Furthermore it is often cumbersome and difficult for a novice to secure the rope, cable, line, chord or the like to the apparatus. It is also desirable to provide a clamping device in which only one operator is needed to vary the effective length of the traction member and/or vary the tension it is under.

OBJECTS OF THE INVENTION

It is the principal object of our invention to provide an improved clamping device for a traction member, particularly for a rope, cable, cord or like elongate continuous strand, which will overcome drawbacks associated with conventional wire, cable or rope clamps.

It is also an object of our invention to provide an improved clamping device for a traction member, particularly for a rope, cable, cord or the like, with which a single operator can easily vary the tension in a clamped traction member and its effective length.

It is another object of our invention to provide an improved clamping device for a traction member, particularly for a rope, cable, cord or the like, which is simple enough so its operation is obvious even to a novice.

SUMMARY OF THE INVENTION

These objects and others which will become more readily apparent hereinafter are attained in accordance with our invention in a clamping device for a traction member, particularly for a rope, cable, cord or the like.

According to our invention, the clamping device comprises an oblong body composed of an at least nearly rigid material and at least two clamping pieces guided transversely in the oblong body and spaced from each other which are each movable by a respective tightening member and which each have a receiving portion for engaging and holding the a traction member which is positionable against and/or between a local abutting surface of the oblong body.

The term "oblong body" is here used to describe an elongate configuration which is polyhedral and preferably of rectangular cross section and which may be rounded at its ends.

Thus the oblong body can be a massive block provided at least on its opposing ends with rounded surfaces in which guiding surfaces are formed, abutting surfaces for the clamping pieces and supporting and/or bearing surfaces for the tightening members engaged with the clamping pieces.

In a variety of embodiments the block forming the oblong body can have the same cross section along its entire length. However advantageously in one embodiment of our invention the block forming the oblong body has two enlarged end pieces connected with each other by a constricted middle piece. This results in a saving in material during manufacture of the clamping device.

In another embodiment of our invention each clamping piece is formed by a hook-, eye- or eyelet bolt, whose hook, eye and/or eyelet is guided in a transverse slot of the oblong body while the shaft of the hook, eye- or eyelet bolt projects through a passage in the oblong body out from a longitudinal lateral surface of the oblong body positioned opposite to the transverse slot and is engaged with a nut, for example, a wing nut, which acts as the tightening member.

A particularly secure clamping of the rope, cable, cord, or the like can be attained in the clamping device when each of the transverse slots is associated with a lateral depression for the traction member in the oblong body which has a maximum sectional depth to the slot edges and gradually opens to the longitudinal lateral surface of the oblong body.

The hooks, eyes or eyelets of the clamping pieces can be positioned on the same longitudinal lateral surface of the oblong body, and of course the tightening members are then located on the other side of the oblong body.

In another embodiment of our invention, the hook, eye or eyelet of each of the clamping pieces is positioned on a different one of two opposite longitudinal lateral surfaces of the oblong body. The force applied to the oblong body by the rope, cable, cord or the like then acts as a pure tension force along the diagonal of the block, while in the case of the previously described embodiment the block is subjected to both tensional and bending forces.

In a further embodiment of our invention, the clamping piece comprises a shackle on which the tightening member is engaged on each of the shackle legs. The tightening member can be a nut or an eccentric. The eccentric serving as the tightening member is pivotally mounted on an axial pivot member which bears on the ends of both of the shackle legs.

The oblong body and/or block can be formed as a molded piece from plastic (synthetic resin) material. Each of the clamping pieces can be made from metal wire, for example, steel wire, while the tightening member can be metal and/or plastic.

BRIEF DESCRIPTION OF THE DRAWING

The above and other objects, features and advantages of our invention will become more readily apparent from the following description, reference being made to the accompanying drawing in which:

FIG. 1 is a perspective view of a clamping device for a traction member according to our invention;

FIG. 2 is a partially longitudinal cross sectional and partially side elevational view of the clamping device of FIG. 1;

FIG. 3 is a transverse cross sectional view through the clamping device according to FIG. 1 taken along the section line III—III of FIG. 2;

FIG. 3 is a view similar to FIG. 3 showing the use of a hook in place of the eyebolt of FIG. 3;

FIG. 4 is a perspective view of another embodiment of a clamping device for a traction member structured somewhat differently from the embodiment of FIG. 1;

FIG. 5 is a perspective view of an additional embodiment of our clamping device for a traction member also having a different structure than that of FIG. 1;

FIG. 6 is a transverse cross sectional view through yet another embodiment of the clamping device according to our invention; and FIG. 7 is a fragmentary side elevational view of the embodiment of FIG. 6.

SPECIFIC DESCRIPTION

The clamping device 1 for a traction member 15 according to the drawing, has an oblong body 2 composed of at least a nearly rigid material particularly plastic. The oblong body 2 is a massive block provided with rounded surfaces at least at both of its ends.

In this oblong body 2 elongate oval slots 5 are formed in the same longitudinal lateral surface 4 in the embodiment according to FIGS. 1 to 3. Each elongate slot 5 has a partially rounded base segment 6 from which a hole or passage 7 leads through the body 2 to the opposing longitudinal lateral surface 8.

A lateral oval depression 9 in the longitudinal lateral surface 4 is associated with each transverse slot 5 and provides a local abutting surface for the traction member 15. Each lateral depression 9 has its greatest depth at the slot edges and gradually widens from the slot 5 to the longitudinal lateral surface 8.

In the embodiments shown here in each oblong body 2 and/or block two slots 5 with passages 7 are provided spaced from each other.

A hook-, eye- or eyelet bolt 10 is inserted in each slot 5 so that its hook, eye or eyelet 11 is received by this slot 5 so as to be slidable but nonrotatable while the shaft 12 associated with this hook-, eye- or eyelet bolt 10 is guided by the passage 7 and projects out of the longitudinal lateral surface 8 opposing the longitudinal lateral surface 4.

The hook-, eye- or eyelet bolt 10 used in this embodiment is an example of a clamping piece for the clamping device, while the hook, eye or eyelet 11 is an example of a receiving portion of the clamping piece for engaging and holding the traction member 15. The oblong slots 5 and the passages 7 provide guiding surfaces for the clamping piece.

On the free end of the shaft 12 for each hook-, eye- or eyelet bolt 10 a nut, particularly a wing nut 14, is rotated on with a washer 13 interposed. This nut or wing nut 14 acts as a tightening member and the longitudinal lateral surface 8 of the oblong body 2 forms a bearing or supporting surface for this wing nut 14.

The hook, eye or the eyelet 11 of each hook-, eye- or eyelet bolt 10 receives a wire rope 15 or portion of a rope 15 pulled through it. So that the rope 15 can be pulled through the hook, eye or eyelet 11, the eyelet bolt (or hook 11' in FIG. 3a) is pushed out from the longitudinal lateral surface 4 of the oblong body 2 after a suitable back rotation of the wing nut 14 as can be seen in the lower portion of FIGS. 1 and 2.

Thus by pulling on the wing nut 14 mounted on the shaft 12, the hook, eye or eyelet 11 is pulled into the transverse slot 5 of the oblong body 2, whereby the rope or the portion of the rope 15 is clamped in the transverse slot 5 and the depression 9 and associated abutting surface laterally connected to it.

Of course, after loosening the hook-, eye- or eyelet bolt 10, the rope portion or rope 15 associated with it can be clamped by exertion of a pulling force and secured to the oblong body 2 in the clamped position by manually pulling the wing nut 14.

In the embodiment shown in FIGS. 1 to 3 of the clamping device the hook-, eye- or eyelet bolt 10 acts as a clamping piece so that when it is inserted in the oblong body 2 its hook, eye or eyelet 11 is near one and the same longitudinal lateral surface 4.

In FIG. 4, an embodiment of the clamping device 1 is shown in which the hook, eye or eyelet 11 of each of the hook-, eye- or eyelet bolts 10 is placed on the longitudinal lateral surfaces 4 and 8 with one hook, eye or eyelet 11 on each of the lateral surfaces 4 and 8. Except for that, the embodiment of FIG. 4 is the same as the embodiment described above and shown in FIGS. 1 to 3.

As can be seen from FIGS. 1 to 4, in both embodiments above the block forming the oblong body 2, is the same along its entire length, that is, along its entire length it has a square cross section, which is interrupted only by the transverse slots 5 and the passages 7.

In FIG. 5, another embodiment of the clamping device 1 is shown, in which the block forming the oblong body 2 has two enlarged end pieces 2b and 2c connected with each other by a constricted middle piece 2a. The hook-, eye- or eyelet bolts 10 acting as a clamping piece are provided in these two enlarged end pieces 2b and 2c.

The form of the oblong body shown in FIG. 5 is particularly suitable for manufacture from plastic material in an injection molding process, because near the constricted middle piece 2a unnecessary waste deposits are avoided so that the durability of the oblong body 2 versus the occurring forces is improved.

In FIG. 6, a clamping device 1 comprising a clamping piece for the rope 15 or the like in the oblong body 2 is shown, in which a hook-, eye- or eyelet bolt with nut, particularly wing nut, is unnecessary. According to FIG. 6, a U-shaped shackle 16 is insertable as a clamping piece in each transverse slot 5 of the oblong body 2 whose shackle legs 16a are guided through passages 7a so that they project out of the opposing longitudinal lateral surface 8. There both legs 16a are attached with each other by a axial pivot member 17 on which an eccentric 18 is limitedly rotatable as a tightening member whose peripheral surface engages the longitudinal lateral surface 8 of the oblong body 2 which forms a supporting and/or bearing surface for it. The eccentric 18 is advantageously provided with a handle 18a, by means of which it may be shifted between a loosened position and a clamped position. The operation of the clamping device 1 shown in FIGS. 6 and 7 is otherwise the same as the embodiments shown in FIGS. 1 to 5.

In conclusion, the clamping device 1 of the previously described type, may be used for erection of masts, poles or trees, but it also can be used for providing traction for washing lines, ship's tackle or the like.

We claim:

1. A clamping device for a traction member comprising:
    an oblong body composed of plastic material;
    a plurality of transverse slots formed in one longitudinal lateral surface of said oblong body;
    a plurality of passages formed in said oblong body, each of said passages being connected to one of said transverse slots at one end thereof and to the longitudinal lateral surface opposing said longitudinal lateral surface having said slots therein at the other end;

two eye bolts with eyelets respectively guided in said transverse slots of said oblong body, shafts of each of said eye bolts projecting through the respective passages out from a longitudinal lateral surface opposing the longitudinal lateral surface having said slots therein;

a wing nut engaged with each of said hook-, eye-, or eyelet bolts; and a plurality of lateral depressions in said oblong body each of which is associated with one of said transverse slots, and orthogonally positioned thereto each of said eyelets receiving and engaging said traction member which rests in said lateral depressions when said wing nuts are tightened.

2. The clamping device defined in claim 1 wherein said oblong body is a massive block provided at least on opposing ends thereof with rounded surfaces in which guiding surfaces for said clamping pieces, said abutting surfaces for said clamping pieces and bearing surfaces for said tightening member engaged with said clamping piece are formed.

3. The clamping device defined in claim 1 wherein said block forming said oblong body has the same cross section along the entire length thereof.

4. The clamping device defined in claim 1 wherein said block forming said oblong body has enlarged end regions connected with each other by a constricted middle region.

5. The clamping device defined in claim 1 wherein said each of said transverse slots is associated with a lateral depression for said traction member in said oblong body which has a maximum sectional depth at the edges of said one of said transverse slots and gradually widens from said transverse slot to said longitudinal lateral surface.

6. The clamping device defined in claim 1 wherein said eyes of both said clamping pieces are positioned on the same one of said longitudinal lateral surfaces of said oblong body.

7. The clamping device defined in claim 1 wherein said clamping device has two of said clamping pieces and an eye of each of said clamping pieces is positioned on a different one of said longitudinal lateral surfaces of said oblong body.

8. The clamping device defined in claim 1 wherein said oblong body is formed as a molded piece from a plastic material.

9. The clamping device defined in claim 1 wherein each of said clamping pieces is made from metal wire.

10. The clamping device defined in claim 9 wherein said metal wire is steel wire.

* * * * *